US011750528B2

United States Patent
Mishra et al.

(10) Patent No.: US 11,750,528 B2
(45) Date of Patent: Sep. 5, 2023

(54) COMMUNICATION SESSION ADDITION VIA A HOST IN DENY NEW SERVICE MODE

(71) Applicant: AVAYA INC., Santa Clara, CA (US)

(72) Inventors: Amit Mishra, Broomfield, CO (US); Joel Ezell, Broomfield, CO (US); Thorsten Ohrstrom Sandgren, Thornton, CO (US)

(73) Assignee: Avaya Inc., Santa Clara, CA (US)

( * ) Notice: Subject to any disclaimer, the term of this patent is extended or adjusted under 35 U.S.C. 154(b) by 328 days.

(21) Appl. No.: 15/613,841

(22) Filed: Jun. 5, 2017

(65) Prior Publication Data
US 2018/0351875 A1    Dec. 6, 2018

(51) Int. Cl.
*H04L 47/80* (2022.01)
*H04L 47/70* (2022.01)

(52) U.S. Cl.
CPC ............ *H04L 47/805* (2013.01); *H04L 47/70* (2013.01); *H04L 47/803* (2013.01)

(58) Field of Classification Search
None
See application file for complete search history.

(56) References Cited

U.S. PATENT DOCUMENTS

| | | | |
|---|---|---|---|
| 6,360,270 B1 * | 3/2002 | Cherkasova | H04L 41/5019 709/219 |
| 8,634,543 B2 | 1/2014 | Flockhart et al. | |
| 8,914,446 B2 | 12/2014 | Braudes | |
| 8,995,646 B2 * | 3/2015 | Hollander et al. | |
| 2008/0253387 A1 * | 10/2008 | Liang | H04L 1/1877 370/412 |
| 2009/0310484 A1 * | 12/2009 | Sisalem | H04L 12/66 370/230 |
| 2009/0328186 A1 * | 12/2009 | Pollutro | G06F 21/31 726/13 |

(Continued)

FOREIGN PATENT DOCUMENTS

| | | |
|---|---|---|
| CN | 105556980 | 5/2016 |
| JP | 2008-103952 | 5/2008 |
| JP | 2012-248169 | 12/2012 |

OTHER PUBLICATIONS

Official Action with English Translation for China Patent Application No. 201810569712.3, dated Jul. 8, 2020 20 pages.

(Continued)

*Primary Examiner* — Mohamed A. Wasel
*Assistant Examiner* — Mohammad A. Mian
(74) *Attorney, Agent, or Firm* — Sheridan Ross P.C.

(57) ABSTRACT

Communication servers hosting interactions between requesting devices and resources may require load sheading or maintenance and, as a result, be placed in Deny New Service (DNS) mode, whereby a subsequent session request is refused while existing sessions continue until concluded. However, an interaction comprising an existing session may be supplemented by a subsequent session, often utilizing a different application layer implementation. By providing the requesting device with an interaction identifier, a subsequent session made after the server has been placed in DNS mode, may be accepted and associated with the same resource associated with the existing session.

20 Claims, 5 Drawing Sheets

(56) References Cited

U.S. PATENT DOCUMENTS

| | | | |
|---|---|---|---|
| 2010/0211625 A1* | 8/2010 | Gonzalez Plaza | G06F 9/4862 |
| | | | 709/202 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0295996 A1* | 12/2011 | Qiu | G06F 9/505 |
| | | | 709/224 |
| 2012/0195413 A1* | 8/2012 | Liu | H04L 67/02 |
| | | | 379/93.09 |
| 2012/0246293 A1* | 9/2012 | De Jager | G06F 21/552 |
| | | | 709/224 |
| 2012/0259925 A1* | 10/2012 | Braudes | H04L 51/16 |
| | | | 709/206 |
| 2013/0021904 A1* | 1/2013 | Dolan | H04W 76/18 |
| | | | 370/230 |
| 2017/0171200 A1* | 6/2017 | Bao | H04L 63/0884 |

OTHER PUBLICATIONS

Official Action for India Patent Application No. 201824020961, dated Sep. 22, 2020 6 pages.
Official Action with English Translation for Japan Patent Application No. 2018-107703, dated Jun. 20, 2019 6 pages.
Decision to Grant for Japan Patent Application No. 2018-107703, dated Oct. 10, 2019 3 pages.
Official Action with English Translation for China Patent Application No. 201810569712.3, dated Mar. 15, 2021 13 pages.
Notice of Allowance with English Translation for China Patent Application No. 201810569712.3, dated Jul. 2, 2021 4 pages.

* cited by examiner

COMMUNICATION SESSION ADDITION VIA A HOST IN DENY NEW SERVICE MODE

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communicating and particularly to enabling multiple communication pathways comprising a single communication session.

BACKGROUND

Servers utilized to facilitate communications between parties often support different communications within a single dialog (e.g., an interaction between a customer utilizing a customer communication device and an agent utilizing an agent communication device). For example, a single dialog may comprise one or more voice components, video components, text chat, social media, co-browsing, etc. so that a customer may be discussing an issue with an agent, via a voice communication, and viewing or manipulating information on a webpage, via a data communication.

Communication servers may be required to shut down partially or completely, such as to shed communications when overloaded or to enable maintenance activity. Shutting down a server is preferably done gracefully, whereby existing communication tasks are allowed to continue to completion and new tasks are declined, after all the tasks are completed the server may be taken out of service without disrupting business operations.

Servers hosting communications utilizing Session Initiation Protocol (SIP) provide communications in the form of a dialog which may comprise a plurality of messages (e.g., signal and data messages). A SIP server, even if configured to deny new services (e.g., in a Deny New Service (DNS) mode), recognizes and accepts a new message that is associated with an existing dialog. If the server receives a message from outside an existing dialog (e.g., a new call), the server denies the call and a Session Manager (SM) may then route the messages to one or more other servers accepting new dialogs/messages. Despite the advantages provided by the prior art servers, problems remain.

SUMMARY

These and other needs are addressed by the various embodiments and configurations of the present invention. The present invention can provide a number of advantages depending on the particular configuration. These and other advantages will be apparent from the disclosure of the invention(s) contained herein.

As an overview, and in one embodiment, systems and methods are provided to allow messages to be processed by a server, for an existing communications session, while the server is in a DNS state and otherwise denying messages not associated with an existing session hosted by the server. In another embodiment, a new communication session may be accepted by the server in the DNS state when the new communication session comprises an interaction ID of an existing session on the server. In another embodiment, an HTTP request may include an interaction ID that references an existing SIP session. This allows the server to associate this new message with the existing SIP session so that it will process the new HTTP message even though it is in DNS mode.

It should be appreciated by those of ordinary skill in the art that the interaction ID and other embodiments disclosed are different from the session ID as it is known in the prior art. In particular, a server having a session may receive messages comprising a session ID and then associate those messages with the same session. However, an interaction ID allows, among other things, for a new session to be accepted and associated with a prior session, the new and prior sessions comprising a single interaction. For example, a customer may engage in an HTTP web chat (e.g., a first session) with an agent and utilizing a particular server. The particular server is subsequently placed in DNS mode, after which the customer and/or agent then initiates a SIP call as a component of the same interaction. With benefit of the embodiments disclosed, the SIP call, which comprises a different session, and a different session identify, but also comprises an interaction ID may be incorporated into the same interaction as an exception to the DNS policy of the server.

In prior art servers, when DNS is enabled for one protocol (e.g., HTTP), then all HTTP requests are rejected as no means exist to associate new HTTP messages with that of an existing session. The same prior art server may also utilize another protocol (e.g., SIP) and receive an INVITE message from a media server. The INVITE message is rejected as the prior art server is unable to identify the received INVITE message as associated with an existing session utilized for HTTP.

In one embodiment, a solution to the limitations of the prior art servers is provided whereby incoming HTTP messages comprise an "interactionID" query parameter specified in a callback Uniform Resource Locator (URL) of the address of the particular external entity sending the HTTP message. The server hosting the calls will then determine whether the incoming HTTP message is related to an interaction in progress and, if so, will accept the message for processing. It should be appreciated that, with respect to certain embodiments disclosed herein, no additional overhead is required, which would otherwise be necessary to reconstruct a conversation comprising different messages and the session previously initiated is allowed to continue despite the server being in a DNS state and without require any additional reconstruction overhead on a different server. In another embodiment, the HTTP message comprises an HTTP-Secure (HTTPS) message.

In another embodiment: (1) an HTTP request is sent to the media server asking for an SDP offer; (2) a callback URL is utilized comprising an interaction ID; (3) the media server sends an HTTP message back to the specified callback address, via the callback URL, with the SDP offer; and (4) As the message has the interaction ID, the message is accepted and routed to its intended target, such as an agent.

In another embodiment, an incoming call or webchat has caused a workflow to be created on a server. The workflow requests an agent from Work Assignment. Work Assignment specifies a callback URL for this request of the form:
   https://serverfqdn.example.com/services/workflow_engine?interaction_id=12345 where "interaction_id" is unique to that workflow or interaction.

The server is then put into DNS. Any new call/chat that is offered to the server is rejected and re-routed to an alternate server. However, "work assignment" invokes the callback URL with the selected agent and, since this request has an "interaction_id", it is allowed.

In one embodiment, a system is disclosed, comprising: a processor; and a network interface to a communications network; and wherein the processor, upon receiving, via the network interface, a request for a new session performs: determining whether a server is in a Deny New Service (DNS) mode; upon determining the server is not in DNS mode, accepting the request; upon determining the server is in DNS mode, determining whether the request comprises an interaction identifier; upon determining the server is in DNS mode and the request is devoid the interaction identifier, denying the request; upon determining the server is in DNS mode and the request for the new session does comprise the interaction identifier, accepting the request; and wherein accepting the request comprises establishing the new session between a requesting device and a resource device via the communications network.

In another embodiment, a method is disclosed, comprising, issuing a first request for a first communication session between a requesting device and a resource device via a network wherein the first communication session is hosted by a server; in response to the first request, receiving an interaction identifier; in response to the first request, initiating the first communication session comprising the exchange of computer encoded and decoded data between the requesting device and the resource device via the network; at a later time, after the first communication session has been initiated, issuing a second request for a second communication session between the requesting device and the resource device via the network, the second request comprising the interaction identifier; and in response to the second request, initiating the second communication session comprising the exchange of computer encoded and decoded data between the requesting device and the resource device via the network.

In another embodiment, a method is disclosed, comprising: receiving, at a server, a first request for a first communication session; determining whether the server is in a Deny New Service (DNS) mode; upon determining the server is not in DNS mode, enabling the first communication session; upon determining the server is in DNS mode, determining whether the first request comprises an interaction identifier; upon determining the server is in DNS mode and the first request is devoid the interaction identifier, denying the first request; upon determining the server is in DNS mode and the request for the first session does comprise the interaction identifier, accepting the request; and wherein accepting the first request comprises establishing the first session comprising the exchange of computer encoded data between the requesting device, providing the received first request, and a resource device utilizing a communications network; and wherein denying the request for the new session comprises.

The term "communication session" or merely, "session" is used interchangeably to describe the interaction (e.g., an exchange of computer encoded/decoded messages) between two computer devices communicating over a network. An "interaction" may comprise one or more sessions. A "session" may comprise a single message or a plurality of messages.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
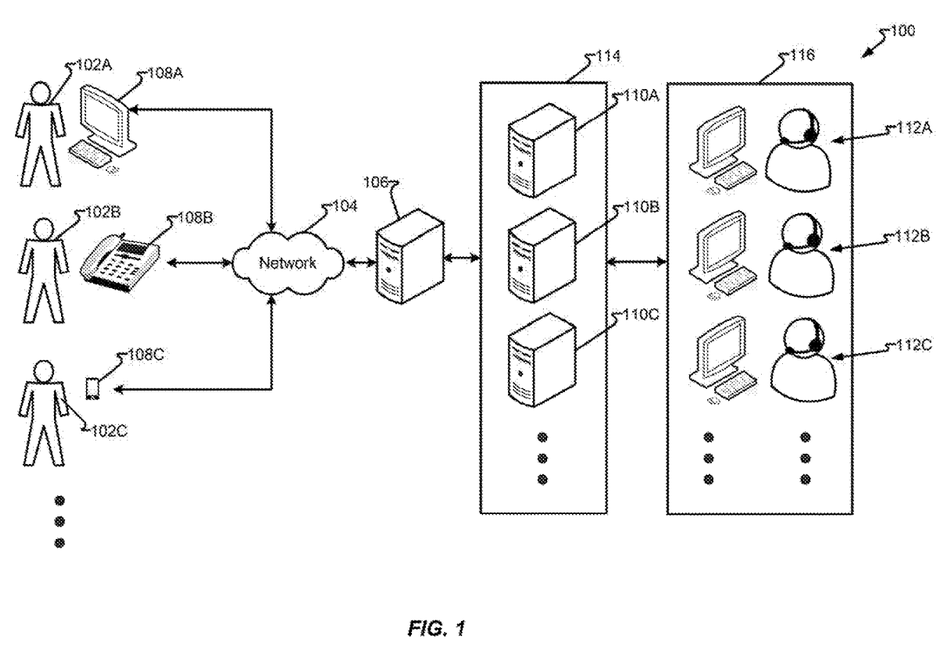
FIG. 1 depicts a first system in accordance with embodiments of the present disclosure.

FIG. 1 depicts system 100 in accordance with embodiments of the present disclosure. In one embodiment, system 100 comprises a number of requesting devices 108 seeking interaction with resource devices 112. Requests from any particular requesting device 108 may be made without regard to a specific resource device 112. Customers 102 may then utilize their respective requesting device 108 to interact with a resource (e.g., human agent, automated agent, plurality of agents, etc.), such as via network 104. Requesting devices 108 may be a single purpose or multipurpose device and comprise, for example, a desktop computer, notebook computer, tablet computer, smart phone, digital (e.g., VoIP) telephone, analog telephone (e.g., POTS), and/or other device or combinations thereof (e.g., a desktop computer or cellular telephone executing a soft phone application). One or more customers 102 may utilize a plurality of requesting devices 108. Additionally, network 104 may comprise a public network (e.g., Internet), private network (e.g., Intranet), and/or other networks including wired and/or wireless networks.

In another embodiment, communication management server 106 allocates a particular server 110 from server pool 114 and, in turn, establishes a communication session with a particular resource 112 (e.g., a computer associated with a human agent, a processor executing an automated agent, etc.). Communication management server 106 may form a portion of the communication session or, in another embodiment, merely setup and/or monitor the communication session. Communication server 106 may comprise a load balancer to balance the load of servers 110.

In another embodiment communication management server 106 may request a communication session from a particular server 110 and, if denied, re-request the communication session from a different server 110. Server 110 may require maintenance or otherwise require termination of services. In another scenario, server 110 may have reached, or is predicted to reach, an overload state and need to shed sessions gracefully. That is, current sessions should be allowed to continue until completion (e.g., the session is ended by a signal from the particular requesting device 108 and/or the particular resource device 112 engaged in a communication session) and new tasks, such as new communication sessions, refused such as to be processed by a different server 110. A refusal may be passive, such as to merely ignore the message, or active, such as to reply with a message indicating the refusal. When such an event occurs, server 110 may enter a Deny New Service (DNS) state or mode, whereby existing processes (e.g., communications sessions) are allowed to continue and utilize resources of server 110, but new processes are denied and a management process, such as one executed by communications management server 106, may route subsequent requests to alternative servers 110 that are not in a DNS mode.

In another embodiment, a single server, such as server 110A operates alone, that is with a connection to network 104 and to one or more resource 112 and without communication management server 106 and without other servers (e.g., servers 110B, 110C, etc.). Server 110A, when being shut down or overloaded, may then enter DNS mode and deny subsequent requests for a new session, unless such a subsequent request included an interaction identifier associated with a previously established session that is presently ongoing. The single server may or may not reply or otherwise broadcast its DNS mode.

In another embodiment, servers 110 may report DNS to communication management server 106, which may perform the acts of routing new sessions to servers 110 not in DNS mode or, to a server 110 in DNS mode provided the session has an interaction identifier associated with a previously established session that is presently ongoing with the particular server 110.

Figure 2:
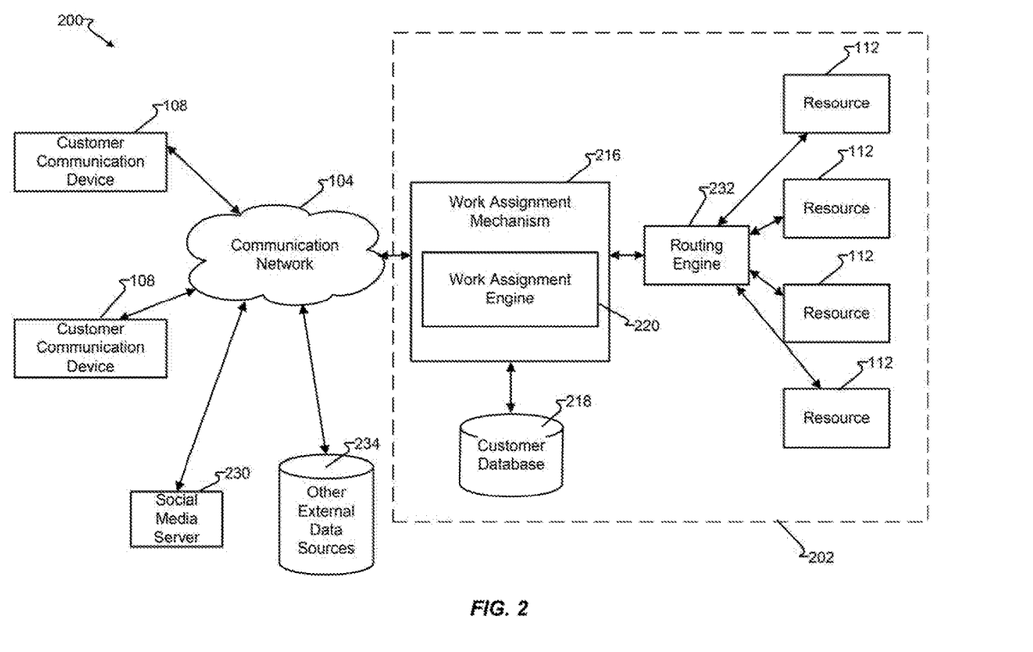
FIG. 2 depicts a second system in accordance with embodiments of the present disclosure

FIG. 2 depicts system 200 in accordance with at least some embodiments of the present disclosure. The communication system 200 may be a distributed system and, in some embodiments, comprises a communication network 104 connecting one or more communication devices 108 to a work assignment mechanism 216, which may be owned and operated by an enterprise administering contact center 202 in which a plurality of resources 112 is distributed to handle incoming work items (in the form of contacts) from customer communication devices 108.

Contact center 202 is variously embodied to receive and/or send messages that are themselves, or are associated with, work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 202 may include more or fewer components than illustrated and/or provide more or fewer services than illustrated. The border indicating contact center 202 may be a physical boundary (e.g., a building, campus, etc.), legal boundary (e.g., company, enterprise, etc.), and/or logical boundary (e.g., resources 112 utilized to provide services to customers for a customer of contact center 202).

Furthermore, the border illustrating contact center 202 may be as-illustrated or, in other embodiments, include alterations and/or more and/or fewer components than illustrated. For example, in other embodiments, one or more of resources 112, customer database 218, and/or other component may connect to routing engine 232 via communication network 104, such as when such components connect via a public network (e.g., Internet). In another embodiment, communication network 104 may be a private utilization of, at least in part, a public network (e.g., VPN); a private network located, at least partially, within contact center 202; or a mixture of private and public networks that may be utilized to provide electronic communication of components described herein. Additionally, it should be appreciated that components illustrated as external, such as social media server 230 and/or other external data sources 234 may be within contact center 202 physically and/or logically, but still be considered external for other purposes. For example, contact center 202 may operate social media server 230 (e.g., a website operable to receive user messages from customers and/or resources 112) as one means to interact with customers via their customer communication device 108.

Customer communication devices 108 are embodied as external to contact center 202 as they are under the more direct control of their respective user or customer. However, embodiments may be provided whereby one or more customer communication devices 108 are physically and/or logically located within contact center 202 and are still considered external to contact center 202, such as when a customer utilizes customer communication device 108 at a kiosk and attaches to a private network of contact center 202 (e.g., WiFi connection to a kiosk, etc.), within or controlled by contact center 202.

It should be appreciated that the description of contact center 202 provides at least one embodiment whereby the following embodiments may be more readily understood without limiting such embodiments. Contact center 202 may be further altered, added to, and/or subtracted from without departing from the scope of any embodiment described herein and without limiting the scope of the embodiments or claims, except as expressly provided.

Additionally, contact center 202 may incorporate and/or utilize social media website 230 and/or other external data sources 234 may be utilized to provide one means for a resource 112 to receive and/or retrieve contacts and connect to a customer of a contact center 202. Other external data sources 234 may include data sources, such as service bureaus, third-party data providers (e.g., credit agencies, public and/or private records, etc.). Customers may utilize their respective customer communication device 108 to send/receive communications utilizing social media server 230.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 202. Examples of a grid-based contact center 202 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 202, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 216, but rather may be on some other server in the communication network 104 where it is harvested by the work assignment mechanism 216, which generates a work item for the harvested communication, such as social media server 230. An example of such a harvested communication includes a social media communication that is harvested by the work assignment mechanism 216 from a social media network or server 230. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 202 of work to be performed in connection with servicing a communication received at contact center 202 (and, more specifically, the work assignment mechanism 216). The communication may be received and maintained at the work assignment mechanism 216, a switch or server connected to the work assignment mechanism 216, or the like, until a resource 112 is assigned to the work item representing that communication. At which point, the work assignment mechanism 216 passes the work item to a routing engine 232 to connect the communication device 108, which initiated the communication, with the assigned resource 112.

Although the routing engine 232 is depicted as being separate from the work assignment mechanism 216, the routing engine 232 may be incorporated into the work assignment mechanism 216 or its functionality may be executed by the work assignment engine 220.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 216 and routing engine 232. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 202.

As discussed above, the work assignment mechanism 216 and resources 112 may be owned and operated by a common entity in a contact center 202 format. In some embodiments, the work assignment mechanism 216 may be administered by multiple enterprises, each of which has its own dedicated resources 112 connected to the work assignment mechanism 216.

In some embodiments, the work assignment mechanism 216 comprises a work assignment engine 220, which enables the work assignment mechanism 216 to make intelligent routing decisions for work items. In some embodiments, the work assignment engine 220 is configured to administer and make work assignment decisions in a queueless contact center 202, as is described in U.S. patent application Ser. No. 12/882,950, the entire contents of which are hereby incorporated herein by reference. In other embodiments, the work assignment engine 220 may be configured to execute work assignment decisions in a traditional queue-based (or skill-based) contact center 102.

The work assignment engine 220 and its various components may reside in the work assignment mechanism 216 or in a number of different servers or processing devices. In some embodiments, cloud-based computing architectures can be employed whereby one or more components of the work assignment mechanism 216 are made available in a cloud or network such that they can be shared resources among a plurality of different users. Work assignment mechanism 216 may access customer database 218, such as to retrieve records, profiles, purchase history, previous work items, and/or other aspects of a customer known to contact center 202. Customer database 218 may be updated in response to a work item and/or input from resource 112 processing the work item.

It should be appreciated that one or more components of contact center 202 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 202 or shared or distributed amongst a plurality of service provider customers, one being contact center 202.

In one embodiment, a message is generated by customer communication device 108 and received, via communication network 104, at work assignment mechanism 216. The message received by a contact center 202, such as at the work assignment mechanism 216, is generally, and herein, referred to as a "contact." Routing engine 232 routes the contact to at least one of resources 112 for processing.

In another embodiment, routing engine 232 and/or work assignment mechanism 216 may be executed by a processor of communication management server 106. In other embodiments, a separate processing component may be utilized for the execution of at least one of routing engine 232 and work assignment mechanism 216.

Figure 3:
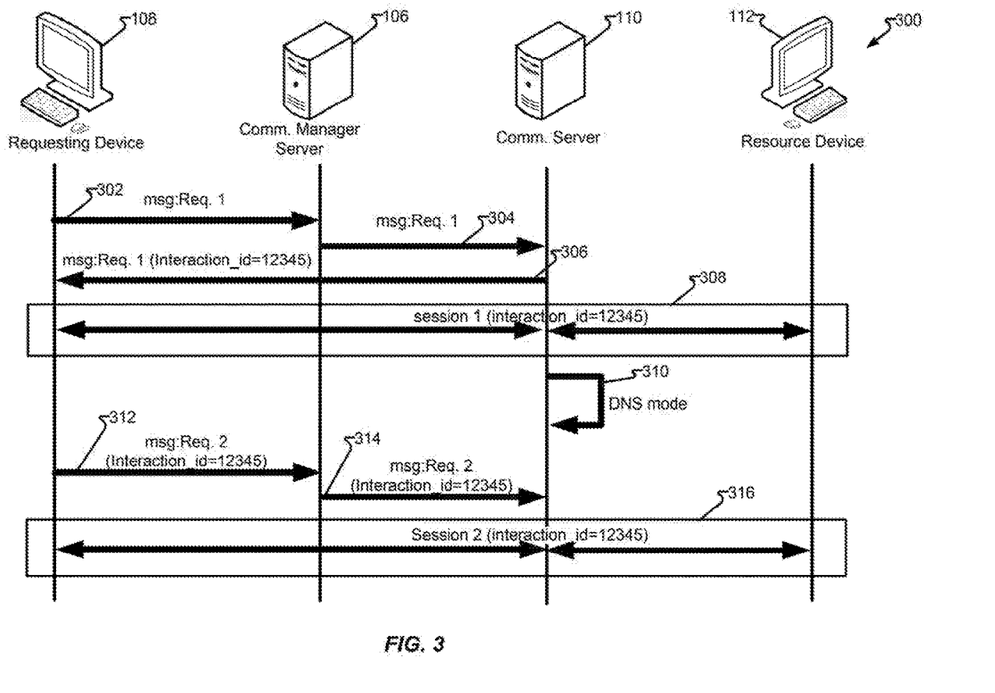
FIG. 3 depicts a first interaction in accordance with embodiments of the present disclosure.

FIG. 3 depicts interaction 300 in accordance with embodiments of the present disclosure. In one embodiment, a device requesting a communication session, such as customer communication device 108, sends first request 302 to communication management server 106. Communication manager serve 106 then forwards the first request 304 to communication server 110A which, in response, sends message 306 comprising an interaction identifier (interaction ID) back to customer device 108. Communication session 308 is then established which may comprise the interaction ID. It should be appreciated that communication session 308 may comprise one or more messages or other exchanges associated within a single session, such as identified by a session cookie. A subsequent session, comprising a subsequent portion of the same interaction, (e.g., session 308 and session 316 comprising the same interaction) cannot utilize the same session identifier as the exchanges are different (e.g., different protocol) be within a single session and, therefore, utilize a session identifier which, as discussed below, fails to associate different session as portions of the same interaction.

In another embodiment, session 308 has been initiated and is presently active (e.g., not concluded) when DNS mode is initiated in step 310 for communication server 110. Requesting device 108 is provided with interaction ID. It should be appreciated that alternative means to provide requesting device 108 with the interaction ID may be utilized without departing from the scope of the embodiments herein. For example, the interaction ID may be provided in one or more messages from communication manager server 106, communication server 110A, or resource device 112 having the sole purpose of providing requesting device 108 with the interaction ID. Additionally or alternatively, the interaction ID may be incorporated into one or more data or other messages exchanged as a component of session 308. In yet another embodiment, the interaction ID may be provided to requesting device 108 in response to an explicit request for the interaction ID.

Next, as requesting device 108 has a valid interaction ID and seeks to establish another communication session with the same resource utilizing resource device 112, requesting device 108 may submit subsequent request 312, comprising the interaction ID. Subsequent request 312 may be issued to communication manager server 106 which, in turn forwards 314 the request to communication server 110. In response, communication server 110A successfully determines the interaction ID associated with request 312 (and/or request 314) comprises the interaction ID which is associated with ongoing session 308 and, in response initiates session 316 between resource 112 and requesting device 108. Upon the conclusion of session 308 and session 316, and any other interactions hosted by communication server 110, communication server 110 may be taken out of service without disruption of any ongoing interactions. In another embodiment, request 302 and/or request 312 may be issued from resource device 112 to communication server 110 and/or communication manager server 106. It should be appreciated that session 316 may comprise a single message or a plurality of messages.

Figure 4:
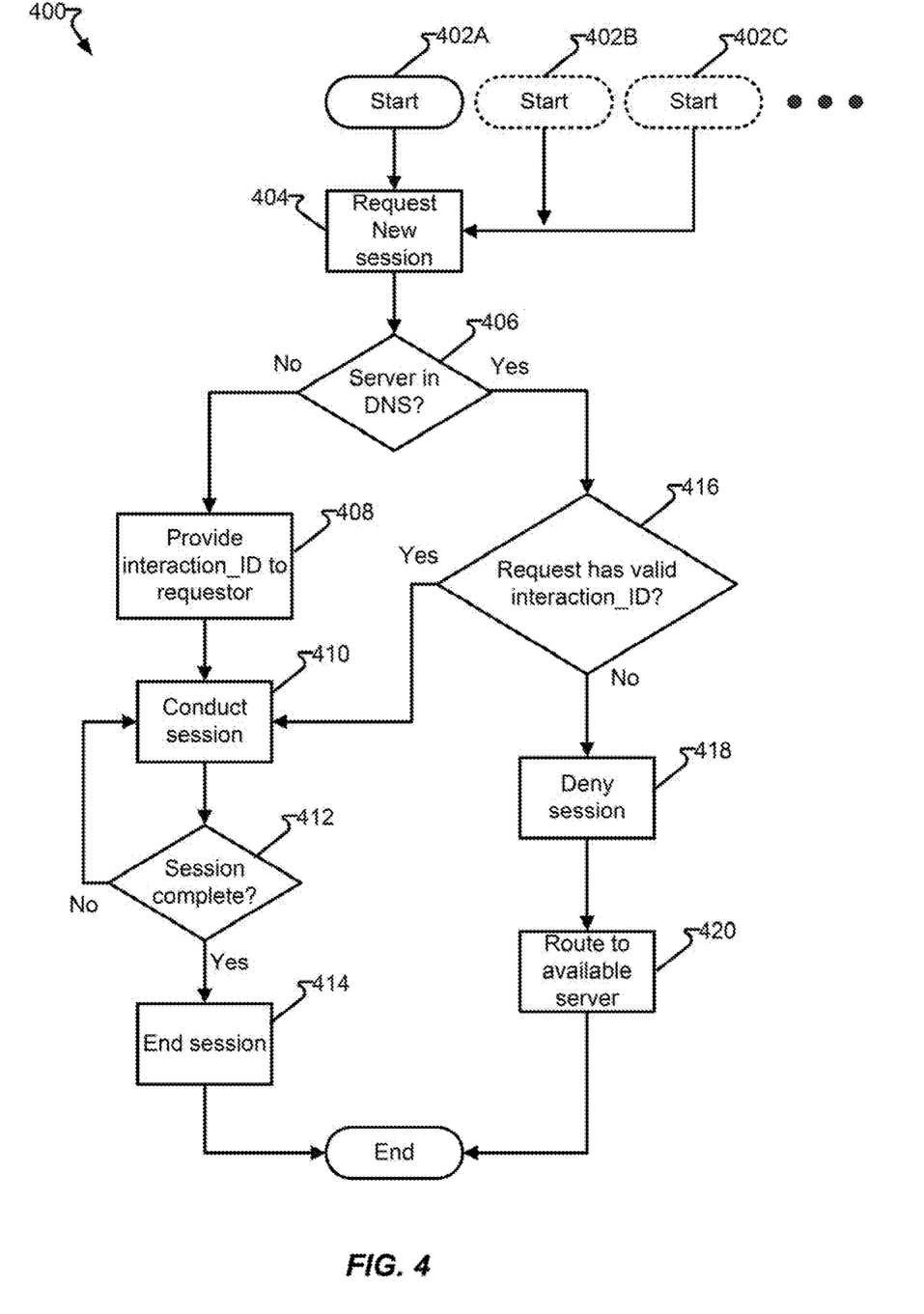
FIG. 4 depicts a first process in accordance with embodiments of the present disclosure.

FIG. 4 depicts process 400 in accordance with embodiments of the present disclosure. Process 400 starts at one of steps 402 (e.g., 402A, 402B, 402C, etc.) as a new session may be requested at any time. In one embodiment, step 404 requests a new session, such as by requesting device 108 sending a request message to communication manager server 106 and seeking an interaction with a resource utilizing, or comprising, resource device 112. The request is then routed for processing by a communications server 110, which may then select a particular resource utilizing resource device 112. A particular server may already be known, such as being associated with an existing session with requesting device 108.

Next, step 406 determines if the selected server is in DNS mode, such as by querying a particular server, accessing a data record in a memory or a database, or other means of maintaining a status of a server. If step 406 is determined in the negative, step 408 may be executed whereby an interaction ID is provided to the requestor. Step 410 conducts the session which continues until step 412 is determined in the affirmative. While step 412 is determined in the negative, session 410 continues. Once step 412 is determined in the affirmative, step 414 ends the session and process 400, for a particular session conducted in step 410, may terminate.

Returning to step 406, which may be determined in the affirmative, step 416 may then request a valid interaction ID, such as one provided to a particular requestor (e.g., one of requesting resource 108) during a prior iteration of process 400 and, more particularly, step 408. If the interaction ID is already known, step 416 may then determine whether or not the provided interaction ID is valid, that is, whether the interaction ID is associated with a concurrent communication session executing (e.g., a different iteration of process 400 and, in particular step 410). If step 416 is determined in the negative, step 418 denies the session which may then be routed to an available server in step 420. If step 416 is determined in the affirmative, step 410 may be performed whereby the session is conducted until determined to have completed, in step 412, and ended in step 414.

Figure 5:
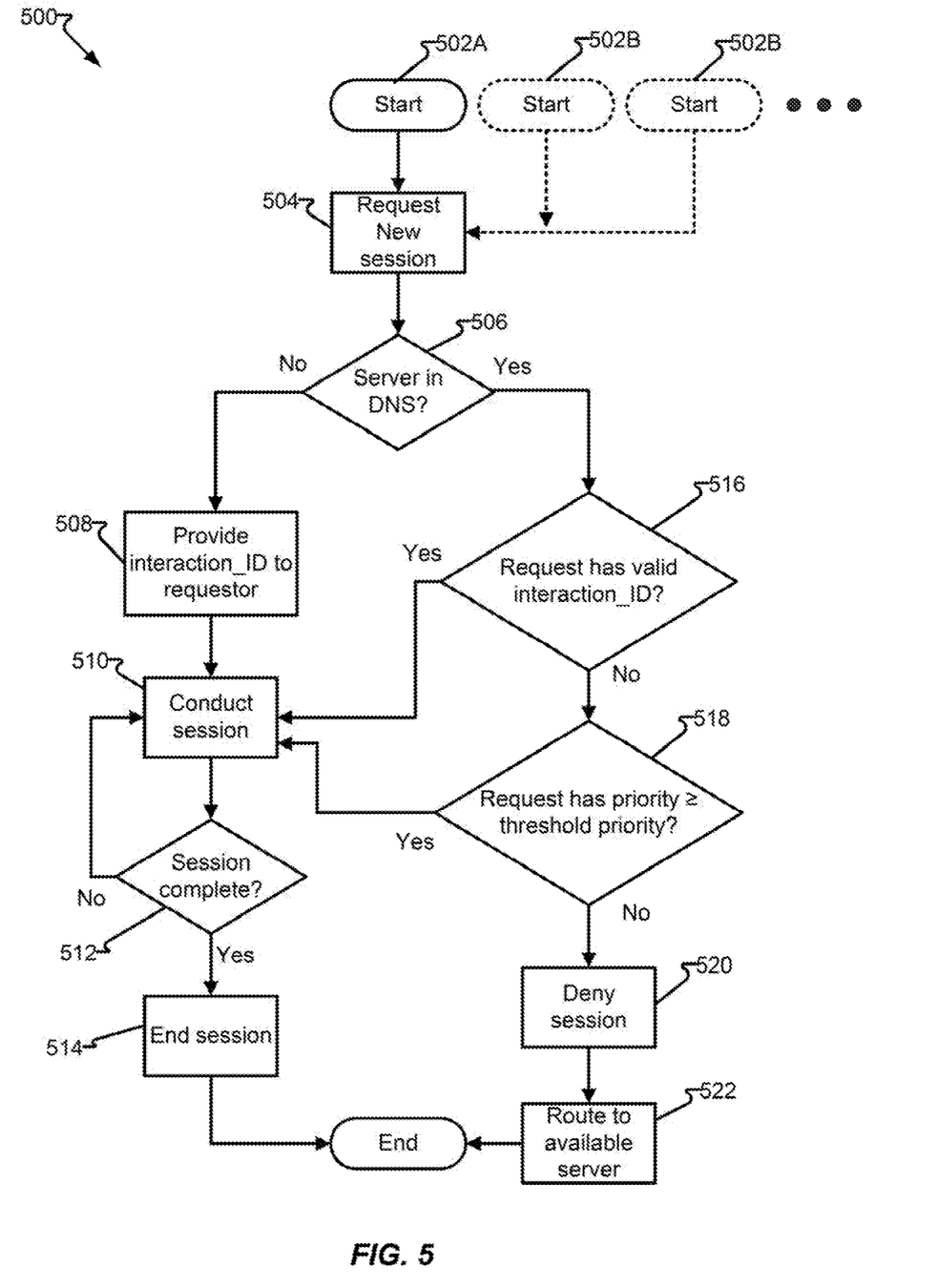
FIG. 5 depicts a second process in accordance with embodiments of the present disclosure.

FIG. 5 depicts process 500 in accordance with embodiments of the present disclosure. Process 500 starts at one of steps 502 (e.g., 502A, 502B, 502C, etc.) as a new session may be requested at any time. In one embodiment, step 504 requests a new session, such as by requesting device 108 sending a request message to communication manager server 106 and seeking an interaction with a resource utilizing, or comprising, resource device 112. The request is then routed for processing by a communications server, which may then select a particular resource utilizing resource device 112. A particular server may already be known, such as being associated with an existing session with requesting device 108.

Next, step 506 determines if the selected server is in DNS mode, such as by querying a particular server, accessing a data record in a memory or a database, or other means of maintaining a status of a server. If step 506 is determined in the negative, step 508 may be executed whereby an interaction ID is provided to the requestor. Step 510 conducts the session which continues until step 512 is determined in the affirmative. While step 512 is determined in the negative, session 510 continues. Once step 512 is determined in the affirmative, step 514 ends the session and process 500, for a particular session conducted in step 510, may terminate.

Returning to step 506, which may be determined in the affirmative, step 516 may then request a valid interaction ID, such as one provided to a particular requestor (e.g., one of requesting resource 108) during a prior iteration of process 500 and, more particularly, step 508. If the interaction ID is already known, step 516 may then determine whether or not the provided interaction ID is valid, that is, whether the interaction ID is associated with a concurrent communication session executing (e.g., a different iteration of process 500 and, in particular step 510). If step 516 is determined in the negative, step 518 may determine if the request has a priority at or above a threshold priority and, if so, process 500 continues to step 510 for execution of the session until ended in step 514.

A threshold priority may be selected in accordance with the workload of a target server and/or the workload of other servers. For example, during a historic period of low activity a number of servers may be placed in DNS mode for maintenance (e.g., hardware and/or software upgrade). An unexpected spike in activity may cause servers not in DNS mode to become overloaded or non-responsive, which may then result in those servers not in DNS mode for maintenance going into DNS mode based on the overloaded state. Merely queuing the requests results to await an available server results in unacceptable delays. Once request for a session has been received, the session must be initiated and processed within an acceptable responsiveness. This may be a contractual requirement (e.g., QoS requirement), to avoid customer dissatisfaction (e.g., user 102 abandons a call, terminates an unanswered chat, etc.), or to avoid a cascading failure. For example, if a number of first sessions are in progress but require the addition of subsequent sessions in order to conclude the first session, a deadlock state may result; the first sessions cannot end until the subsequent sessions are started, but the subsequent sessions cannot be started until the initial sessions have ended and the overwhelmed servers can accept new sessions. Accordingly, providing an exception to a server's current DNS mode, may be provided based on a priority (e.g., emergency, atypical value, etc.) and/or workload of a pool of servers that would otherwise be provided with the session. As a result, requests for sessions may be honored more frequently, even while in DNS mode.

The threshold and/or priority for one or more session requests may be determined by a variety of methodologies. A numeric score, low-mid-high indicia, exception flag, and/or other indicia may be utilized. The threshold/priority may be selected such that a certain number or percentage of session requests, that would otherwise be denied, will be accepted by a server in DNS mode.

The interaction ID may be created by a server, including but not limited to server 110, 106, and/or other computer component operable to create an interaction ID. The interaction ID, when not created by server 110 may be created for access by server 110. The interaction ID may be a globally unique identifier (GUID), a serial number, or based on other numbering scheme determined to be unique within the realm of the operation of server 110. Sessions may be numerically identified by a looping counter. For example, if the number of simultaneous sessions has historically never been greater than a few hundred then, after a sufficiently large number such as 10,000, the sessions may reuse number "1" and continue until the next 10,000 sessions.

In another embodiment, the interaction identifier may be encoded to incorporate the priority indicia. For example, a hash value, block of values, leading or trailing alphanumeric character, etc. may be utilized to allow server 110 to determine a priority of a session request with minimal processing requirements.

If step 518 is determined in the negative, step 520 responds with the denial whereby step 522 may then route the session request to an alternative server. If either step 516 or 518 are determined in the affirmative, step 510 may be performed whereby the session is conducted until determined to have completed, in step 512, and ended in step 514.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (e.g., GPU, CPU), or logic circuits programmed with the instructions to perform the methods (e.g., FPGA). In another embodiment, a processor may be a system or collection of processing components, such as a processor on a client device and a processor on a server, a collection of devices with their own respective processor, or a shared or remote processing service (e.g., "cloud" based processor). A system of processors may comprise task-specific allocation of processing tasks and/or shared or distributed processing tasks.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., processors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a processor may comprise a first processor on one component and a second processor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a processor; and
   a network interface to a communications network; and
   wherein the processor, upon receiving, via the network interface, a request for a new Session Initiation Protocol (SIP) session performs:
      determining whether a server is in a Deny New Service (DNS) mode;
      upon determining that the server is not in DNS mode, accepting the request;
      upon determining that the server is in DNS mode, determining whether the request comprises an interaction identifier, wherein the interaction identifier is associated with a different SIP session;
      upon determining that the server is in DNS mode and the request is devoid the interaction identifier, denying the request; and
      upon determining that the server is in DNS mode and the request for the new SIP session does comprise the interaction identifier, accepting the request; and
   wherein accepting the request comprises establishing the new SIP session between a requesting device and a resource device via the communications network.

2. The system of claim 1, wherein the determining whether the request comprises the interaction identifier further comprises determining whether the interaction identifier is associated with the different SIP session comprising a currently active SIP session that has been previously established between the requesting device and the resource device.

3. The system of claim 2, wherein the new SIP session and the currently active SIP session each utilize an application layer implementation and the application layer implementation is different between the new SIP session and the currently active SIP session.

4. The system of claim 3, wherein one of the new SIP session and the currently active SIP session comprise the application layer implementation utilizing Hypertext Transfer Protocol (HTTP).

5. The system of claim 1, wherein the processor, upon determining that the server is not in DNS mode, replies to the requesting device with the interaction identifier.

6. The system of claim 1, wherein the request for the new SIP session comprises a callback Uniform Resource Locator (URL).

7. The system of claim 1, wherein the server comprises disparate systems managed by signals provided, via the network interface, from the processor.

8. The system of claim 1, wherein the server provides the interaction identifier to the requesting device.

9. The system of claim 1, wherein determining whether the server is in the DNS mode comprises forwarding the request to the server and receiving a DNS reply in response.

10. The system of claim 1, further comprising the processor, upon determining that the server is in DNS mode and the request is devoid of the interaction identifier, further determining whether the request comprises a priority greater than a previously determined threshold priority and, when the request comprises a priority greater than a previously determined threshold priority, accepting the request and, when the request does not comprise a priority greater than a previously determined threshold priority, denying the request.

11. A method, comprising,
   issuing a first request for a first communication Session Initiation Protocol (SIP) session between a requesting device and a resource device via a network wherein the first communication SIP session is hosted by a server;
   in response to the first request, receiving an interaction identifier;
   in response to the first request, initiating the first communication SIP session comprising an exchange of computer encoded and decoded data between the requesting device and the resource device via the network;
   at a later time, after the first communication SIP session has been initiated, issuing a second request for a second communication SIP session between the requesting device and the resource device via the network, the second request comprising the interaction identifier;
   determining whether the server is in a Deny New Service (DNS) mode;
   upon determining that the server is not in DNS mode, accepting the second request; and
   upon determining that the server is in DNS mode, further determining whether the second request comprises an interaction identifier, wherein the interaction identifier is associated with a different SIP session, and denying the second request when the interaction identifier is absent and accepting the second request when the interaction identifier is present; and
   wherein accepting the second request further comprises initiating the second communication SIP session comprising the exchange of computer encoded and decoded data between the requesting device and the resource device via the network.

12. The method of claim 11, wherein first communication SIP session and the second communication SIP session each utilize an application layer implementation and the application layer implementation is different between the first communication SIP session and the second communication SIP session.

13. The method of claim 12, wherein one of the first communication SIP session and the second communication SIP session comprise the application layer implementation utilizing Hypertext Transfer Protocol (HTTP).

14. The method of claim 11, wherein at least one of the first request for the first communication SIP session and the second request for the second communication SIP session comprises a computer formatted message.

15. The method of claim 11, wherein at least one of the first request for the first communication SIP session and the second request for the second communication SIP session comprises a priority indicia.

16. A method, comprising:
   receiving, at a server, a first request for a first communication Session Initiation Protocol (SIP) session;
   determining whether the server is in a Deny New Service (DNS) mode;
   upon determining that the server is not in DNS mode, enabling the first communication SIP session;
   upon determining that the server is in DNS mode, determining whether the first request comprises an interaction identifier, wherein the interaction identifier is associated with a different SIP session;
   upon determining that the server is in DNS mode and the first request is devoid the interaction identifier, denying the first request; and
   upon determining that the server is in DNS mode and the first request for the first SIP session does comprise the interaction identifier, accepting the first request; and
   wherein accepting the first request comprises establishing the first SIP session comprising an exchange of computer encoded data between a requesting device, the requesting device providing the received first request, and a resource device utilizing a communications network.

17. The method of claim 16, wherein determining whether the first request comprises the interaction identifier further comprises determining whether the interaction identifier is associated with the different SIP session comprising a currently active SIP session that has been previously established between the requesting device and the resource device.

18. The method of claim 17, wherein the first communication SIP session and the currently active SIP session each utilize an application layer implementation and the application layer implementation is different between a new SIP session and the currently active SIP session.

19. The method of claim 18, wherein one of the first SIP session and the currently active SIP session comprise the application layer implementation utilizing Hypertext Transfer Protocol (HTTP).

20. The method of claim 16, the step of determining whether the server is not in DNS mode, further comprises replying to the first request with a callback Uniform Resource Locator (URL) comprising the interaction identifier.

* * * * *